US008645196B2

(12) United States Patent  
Laskowski et al.

(10) Patent No.: US 8,645,196 B2  
(45) Date of Patent: Feb. 4, 2014

(54) PARKING GARAGE VEHICLE LOCK BOX

(76) Inventors: Edward Paul Laskowski, Montgomery, TX (US); Jason Glen Squier, Cleveland, TX (US)

(\*) Notice: Subject to any disclaimer, the term of this patent is extended or adjusted under 35 U.S.C. 154(b) by 277 days.

(21) Appl. No.: 12/432,134

(22) Filed: Apr. 29, 2009

(65) Prior Publication Data

US 2010/0275530 A1   Nov. 4, 2010

(51) Int. Cl.
*G07B 15/00* (2011.01)
(52) U.S. Cl.
USPC .................................. 705/13; 109/73
(58) Field of Classification Search
USPC ............ 705/13, 35, 39, 44; 109/73; 414/233; 340/932.2
See application file for complete search history.

(56) References Cited

U.S. PATENT DOCUMENTS

| | | | | |
|---|---|---|---|---|
| 3,478,311 A * | 11/1969 | Czingula | .................... | 340/932.2 |
| 3,600,866 A * | 8/1971 | Griffith | ............................ | 52/64 |
| 3,667,172 A * | 6/1972 | Erickson | ........................... | 52/64 |
| 4,574,523 A * | 3/1986 | Nasatka | ............................ | 49/49 |
| 4,589,235 A * | 5/1986 | Anderson | ......................... | 52/28 |
| 4,664,580 A * | 5/1987 | Matoba | ......................... | 414/228 |
| 4,894,654 A * | 1/1990 | Serenbetz | .................. | 340/932.2 |
| 4,986,037 A * | 1/1991 | Jackson, Jr. | ........................ | 52/67 |
| 4,990,757 A * | 2/1991 | Edwards et al. | .............. | 235/384 |
| 5,158,413 A | 10/1992 | Wu | | |
| 5,288,164 A * | 2/1994 | Nasatka | .......................... | 404/10 |
| 6,493,997 B2 * | 12/2002 | Cohen | ............................ | 52/79.9 |
| 7,290,702 B2 * | 11/2007 | Elberbaum | ................... | 235/380 |
| 2002/0164234 A1 * | 11/2002 | Haag | ............................ | 414/277 |
| 2002/0170685 A1 * | 11/2002 | Weik et al. | .................... | 160/133 |
| 2002/0187779 A1 * | 12/2002 | Freeny, Jr. | ..................... | 455/422 |
| 2003/0058081 A1 * | 3/2003 | MacPhail et al. | ............. | 340/5.1 |
| 2003/0075287 A1 * | 4/2003 | Weik, III | ....................... | 160/133 |
| 2003/0098774 A1 * | 5/2003 | Chornenky | .................... | 340/5.1 |
| 2004/0237439 A1 * | 12/2004 | Powell | ............................ | 52/505 |
| 2005/0207876 A1 | 9/2005 | Springwater | | |
| 2006/0162875 A1 * | 7/2006 | Magill et al. | .................. | 160/201 |
| 2007/0022670 A1 * | 2/2007 | Herter | ............................ | 52/79.1 |
| 2007/0223995 A1 * | 9/2007 | Nasatka | ............................ | 404/6 |

FOREIGN PATENT DOCUMENTS

| | | | |
|---|---|---|---|
| JP | 7317429 A | 12/1995 | |
| JP | 11101018 A | 4/1999 | |

OTHER PUBLICATIONS

PCT/US2009/050456 International Search Report and Written Opinion, May 25, 2010.

\* cited by examiner

*Primary Examiner* — Lindsay M. Maguire
(74) *Attorney, Agent, or Firm* — Conley Rose, P.C.

(57) ABSTRACT

A remotely actuatable vehicle security system for a parking garage. In some embodiments, the vehicle security system includes a structure forming an enclosure between a ceiling and a floor of the parking garage and an electronic actuation system. The structure has a closeable opening through which a vehicle enters and leaves the enclosure. The electronic actuation system is configured to actuate a drive mechanism to close the opening or to expose the opening upon receipt of a remotely generated signal.

14 Claims, 12 Drawing Sheets

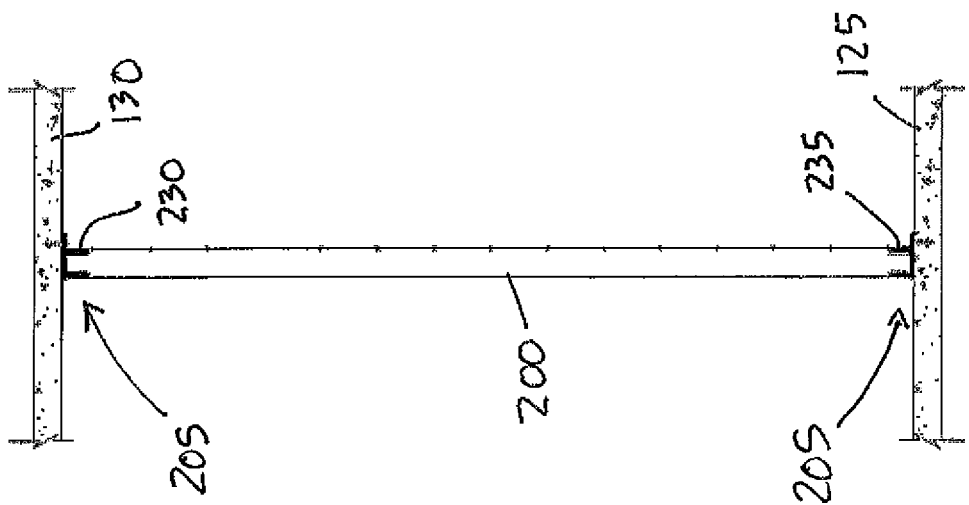

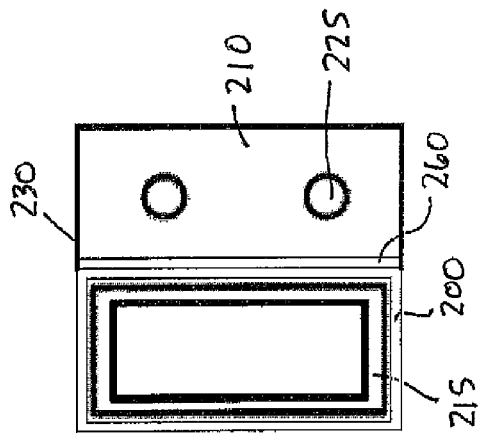
FIG. 3C
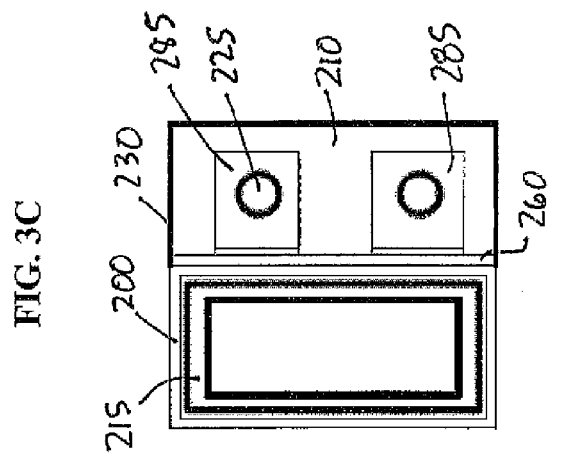
FIG. 3E
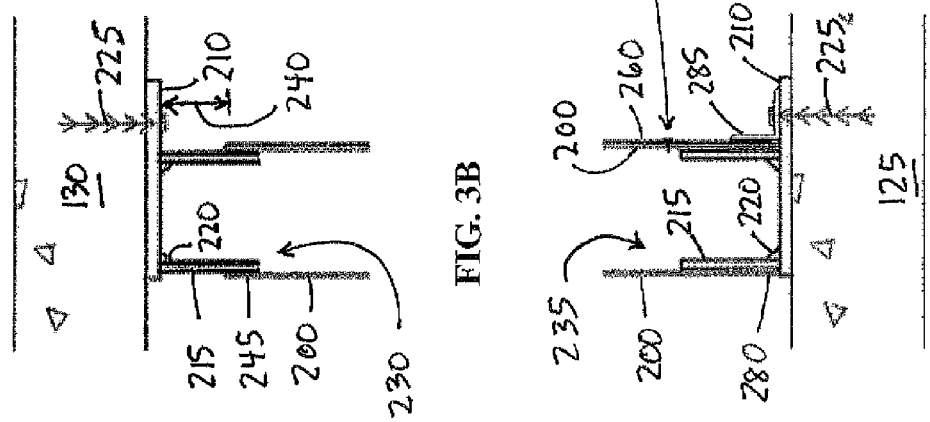
FIG. 3B
FIG. 3D

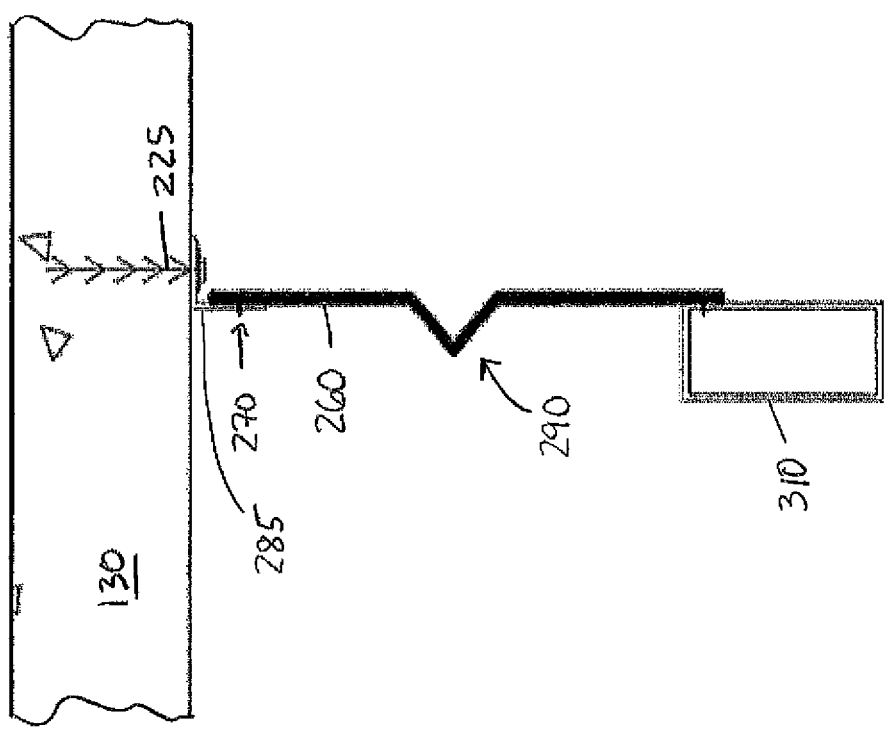

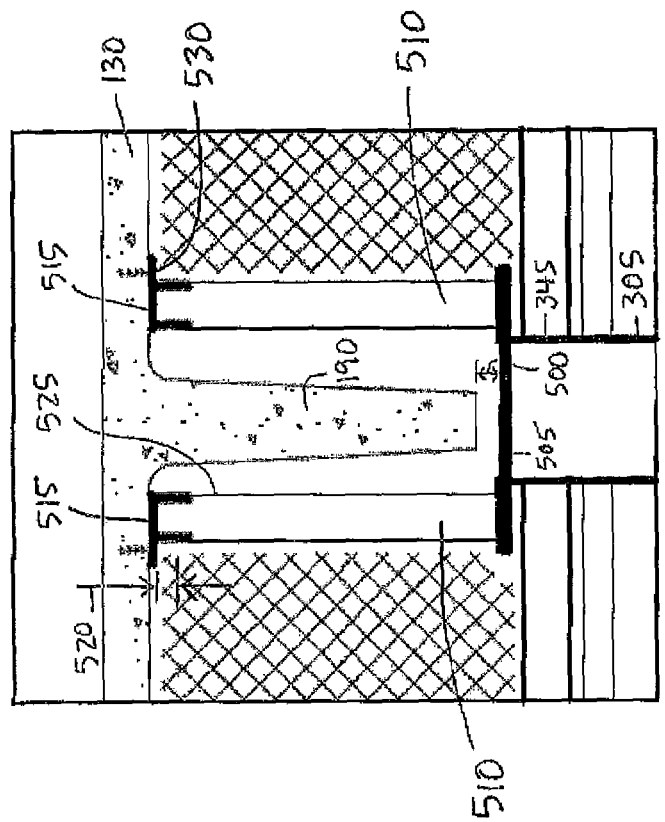
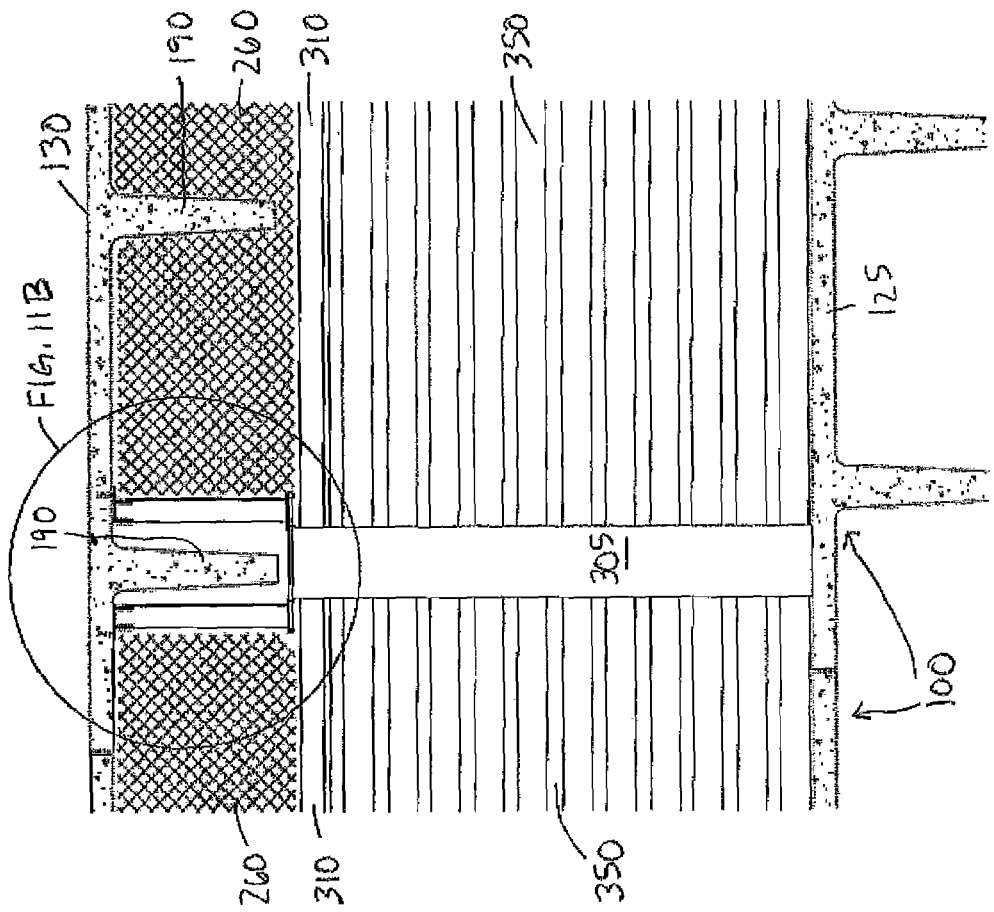
FIG. 11B
FIG. 11A

PARKING GARAGE VEHICLE LOCK BOX

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates generally to security systems for automotive vehicles. More particularly, the present invention relates to enclosures that are remotely actuatable to open to receive a vehicle and to subsequently close to secure the vehicle.

Each year in the United States, there are hundreds of thousand of cars and trucks reported stolen. Also, more than 500,000 break-ins of cars and trucks occur. The number of thefts and break-ins represent significant monetary damages to the vehicle owners. In response to these growing statistics, various types of vehicle security systems have been developed. For example, many new cars and trucks are purchased with an installed alarm system. Alternatively, alarm systems are also available for aftermarket purchase and installation on virtually any vehicle. In the event that an unauthorized individual attempts to enter a vehicle having an alarm system, the alarm is triggered and begins to emit a high-volume sound and/or produce flashing lights, both designed to draw attention to the vehicle and thus scare off the would-be thief or vandal.

Alternatively, or additionally, a vehicle may be equipped with a car immobilizer. These systems typically do not emit sound or produce flashing lights. Instead, these systems are configured to prevent the vehicle from being operational. One well-known example of an immobilizer is a steering wheel lock known as THE CLUB. Once such an immobilizer is locked about the steering wheel of a vehicle, the steering wheel cannot be turned; thus, the vehicle remains inoperable until THE CLUB is unlocked and removed. Another type of immobilizer is a "starter kill," which simply prevents the vehicle from starting without insertion of the appropriate key into the vehicle's ignition.

There are other types of vehicle systems that do not prevent theft of the vehicle but rather enable recovery of the stolen vehicle. Perhaps the most well-known recovery system is the LOJACK system. This system includes a transmitter that may be hidden within a vehicle. After the vehicle is stolen, the transmitter may be activated to emit a signal, which can be tracked by law enforcement authorities having the appropriate equipment to locate and recover the vehicle. As another example, a global positioning system (GPS) may be installed in a vehicle. The GPS enables satellite tracking of the vehicle, including the state of the vehicle's operation and its location in the event the vehicle is stolen.

Car alarm systems and vehicle recovery systems do not prevent unauthorized entry to the vehicle, damage to the vehicle during and subsequent to entry, or theft of the vehicle, including its contents. Although car immobilizers may prevent theft of the vehicle, these devices also do not prevent unauthorized entry, damage, or theft of the vehicle's contents. Accordingly, there exists a need for a vehicle security system that prevents unauthorized entry, vandalism, and/or theft of a vehicle or its contents.

SUMMARY OF THE PREFERRED EMBODIMENTS

Systems and methods for securing a vehicle are disclosed. In some embodiments, the vehicle security system, known as a parking garage vehicle lock box or simply a vehicle lock box, includes a structure forming an enclosure between a ceiling and a floor of the parking garage and an electronic actuation system. The structure has a closeable opening through which a vehicle enters and leaves the enclosure. In some embodiments, the structure further includes an electric outlet positioned on an interior surface of the enclosure to enable recharging of an electrically-powered vehicle stored therein. The electronic actuation system is configured to actuate a drive mechanism to close the opening or to expose the opening upon receipt of a remotely generated signal.

Some methods for securing the vehicle within the parking garage lock box include requesting access to a vehicle lock box, transmitting a first signal to the electronic actuation system, retracting a door covering the closeable opening upon receipt of the first signal, driving a vehicle through the closeable opening into the enclosure, transmitting a second signal to the electronic actuation system, and extending the door to cover the closeable opening and enclose the vehicle within the vehicle lock box upon receipt of the second signal.

Some methods for renting the vehicle lock box include receiving a request for access to a vehicle lock box, receiving payment information, transmitting a first signal to the electronic actuation system, retracting a door covering the closeable opening upon delivery of the first signal, transmitting a second signal to the electronic actuation system, and extending the door to cover the closeable opening and enclose the vehicle within the vehicle lock box upon delivery of the second signal.

In other embodiments, the vehicle security system includes an enclosure formed by a multi-walled structure positioned between a floor and a ceiling of a parking garage and configured to receive the vehicle therein, the enclosure having an closeable opening through which the vehicle is accessible, an attendant system remotely located from the enclosure and configured to control access to the vehicle through the opening, and an electronic actuation system configured to receive a first signal from the attendant system and to deliver a second signal, whereby the opening is covered or exposed.

Thus, the parking garage vehicle lock box and associated systems and methods comprise a combination of features and advantages that enable it to prevent unauthorized access, vandalism, and theft of a vehicle or its contents. These and various other characteristics and advantages of the preferred embodiments will be readily apparent to those skilled in the art upon reading the following detailed description and by referring to the accompanying drawings.

BRIEF DESCRIPTION OF THE DRAWINGS

For a more detailed understanding of the preferred embodiments, reference is made to the accompanying Figures, wherein:

FIGS. 3A, 3B, and 3D are side views of a tubular member of a sidewall or rear wall of the vehicle lock box of FIG. 2 extending between two clip hangers coupled to the ceiling and floor of the parking garage;

FIGS. 3C and 3E are end views of the tubular member in engagement with the clip hangers of FIGS. 3A, 3B, and 3D;

FIG. 7 is a side view of the skin extending between the header of the entry frame and the ceiling;

FIGS. 11A and 11B are an exterior front view and an enlarged view of a coupling between two adjacent, aligned lock boxes with the parking garage ceiling.

DETAILED DESCRIPTION OF THE PREFERRED EMBODIMENTS

Figure 1:
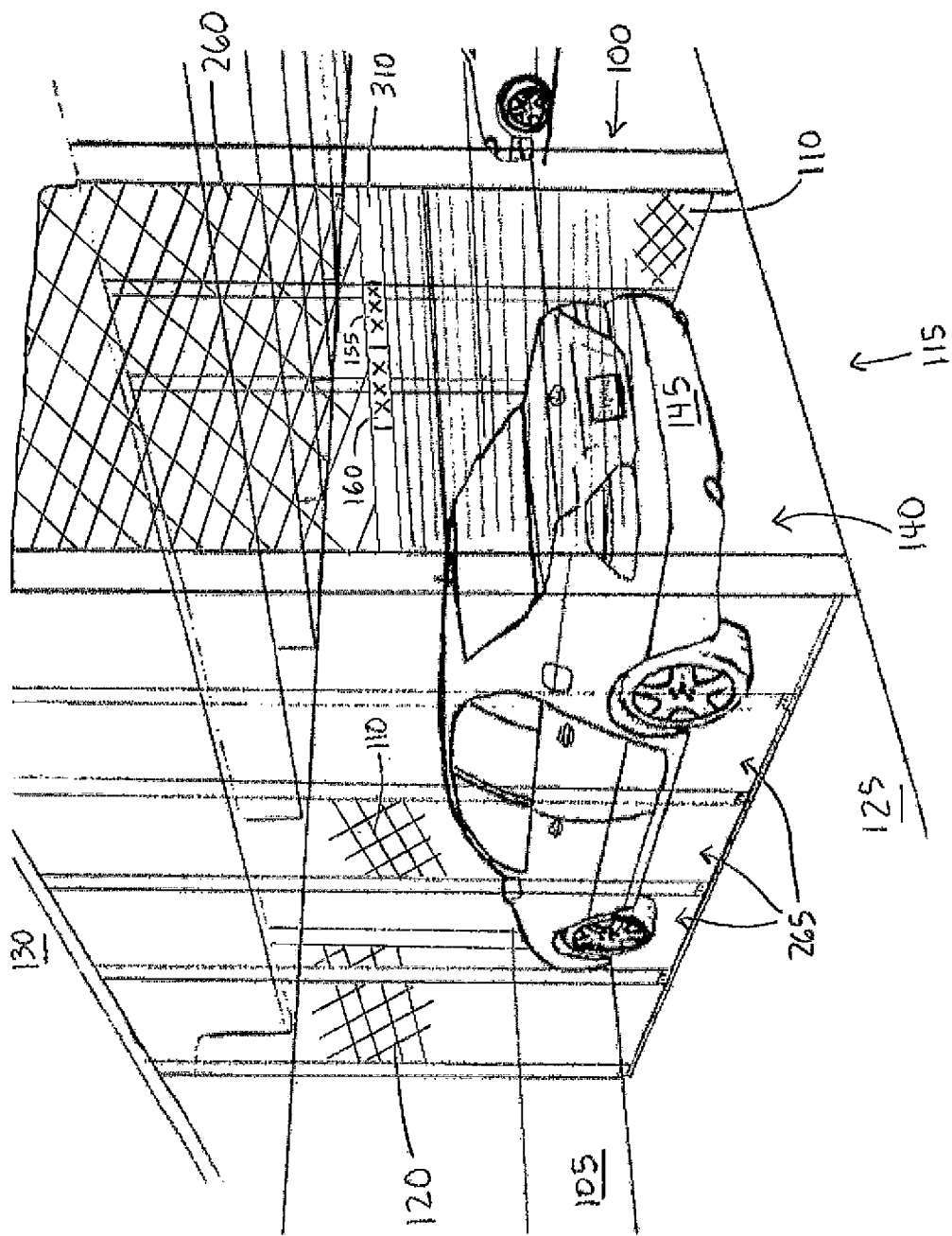
FIG. 1 is a perspective view of a schematic representation of a parking garage vehicle lock box in accordance with the principles disclosed herein.

Certain terms are used throughout the following description and claims to refer to particular system components. This document does not intend to distinguish between components that differ in name but not function. Moreover, the drawing figures are not necessarily to scale. Certain features of the invention may be shown exaggerated in scale or in somewhat schematic form, and some details of conventional elements may not be shown in the interest of clarity and conciseness.

In the following discussion and in the claims, the term "comprises" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

Referring now to FIG. 1, there is shown a perspective view of an embodiment of a vehicle security system 100, referred to herein as a parking garage vehicle lock box or simply a lock box, installed and operational within a parking garage 105. As used herein, "parking garage" is defined as a nonresidential parking garage. Parking garage 105 includes at least a floor 125 and a ceiling 130 between which vehicle lock box 100 is installed. In some embodiments, parking garage 105 is a single level nonresidential parking garage, having a floor and a ceiling with space for vehicle parking therebetween. In other embodiments, parking garage 105 is a multi-level parking garage with space for vehicle parking on one or more of the multiple levels. Further with regard to the multi-level parking garage, the ceiling of one parking level may also be the floor of the adjacent, higher parking level. Lock box 100 includes two side-walls 110, an entry 115, and a rear wall 120, all of which, when coupled between the floor 125 and ceiling 130 of parking garage 105, form an enclosure 140 configured to receive and enclose a vehicle 145 therein. Entry 115 is actuatable to open, thereby enabling vehicle 145 to enter enclosure 140, as illustrated, and to subsequently close, thereby securing vehicle 145 within enclosure 140.

As will be described in greater detail below, lock box 100 is configured to prevent access to vehicle 145 through means typically employed by vandals and thieves. For instance, lock box 100 does not include an external lock, which, when picked or broken, enables entry 115 to open. The mechanism for opening entry 115 is contained within lock box 100 and inaccessible from outside of enclosure 140. Also, sidewalls 110 and rear wall 120 are constructed from materials that are resistive to penetration; their coupling means, too, are inaccessible from outside of enclosure 140. Unlike conventional vehicle security systems described above, lock box 100 prevents any direct contact between vehicle 145 and would-be vandals and thieves, thereby eliminating the opportunity for damage to or theft of vehicle 145 and its contents.

To enable access of lock box 100 by an authorized user, lock box 100 includes an electronic actuation system (EAS) 150 (FIG. 2), a unique identifier 155, and a telephone number 160. In some embodiments, unique identifier 155 is an expression containing one or more numbers, one or more letters, or a combination thereof. Telephone number 160 may be a conventional seven or ten digit telephone number, or a comparatively shorter number representing, for example, and without limitation, an extension number associated with a telephone located within parking garage 105 or another building in the immediate proximity thereof. In this embodiment, EAS 150 is mounted on a drive mechanism 185 (FIG. 2) coupled to entry 115. EAS 150 includes a receiver configured to receive a signal transmitted from a remote location and a transmitter configured to deliver a signal to drive mechanism 185. Alternatively, in place of a transmitter, EAS 150 may be hardwired to drive mechanism 185 and thus able to deliver the signal to drive mechanism 185 along those means. Upon receipt of the signal, drive mechanism 185 is actuated to open or close entry 115, as desired. Identifier 155 and telephone number 160 are displayed proximate entry 115 and enable a user to gain access to lock box 100.

Prior to use, the individual components of lock box 100 are delivered to parking garage 105, where they are assembled in the desired location to form enclosure 140, as shown. Once assembled, an individual entering parking garage 105 and wishing to access lock box 100 to secure a vehicle, such as vehicle 145, therein, simply calls telephone number 160 via his or her phone, informs the answering attendant that the user wishes to access lock box 100 corresponding to identifier 155. The attendant verifies that lock box 100 is empty, and thus available for rental, and then takes personal information identifying the user and payment information from the user. Payment information may include, for example, a credit card number, telephone account number against which charges may be applied, or an account number associated with a payment system.

After the attendant verifies payment information provided by the user, the attendant activates a system to transmit a signal to lock box 100, where the signal is received by EAS 150. Upon receipt of the signal, entry 115 is opened. The user then drives vehicle 145 into enclosure 140, parks vehicle 145, and exits lock box 100. When the user has exited lock box 100 and is clear of entry 115, the attendant transmits a second signal to lock box 100, where the signal is received by EAS 150, and entry 115 is closed, thereby securing vehicle 145 and its contents within lock box 100.

Later, when the user returns to lock box 100 to access or retrieve vehicle 145, the user again calls telephone number 160, provides the answering attendant with information identifying the user, and then requests access to vehicle 145. Upon verification of the user's identity, the attendant again transmits a signal to lock box 100 to open entry 115. The user then accesses or retrieves vehicle 145 from lock box 100. After the user accesses or removes vehicle 145, the attendant transmits a signal to lock box 100 to close entry 115. In the event the user has removed vehicle 145 from lock box 100, the user is charged a rental fee corresponding to the amount of time vehicle 145 was secured within lock box 100. Otherwise, for example, the user accesses vehicle 145 but leaves vehicle 145 within lock box 100, rental fees continue to accumulate to the user until the user finally retrieves vehicle 145 from lock box 100.

In this exemplary embodiment, the user is provided with access to lock box 100 via communication with an attendant monitoring telephone number 160 displayed on entry 115 of lock box 100. In other embodiments, the attendant may be replaced with an automated system configured to receive information provided by the user via the keypad of his telephone and to transmit signals to EAS 150 of lock box 100, as appropriate. Otherwise, operation of lock box 100 remains substantially the same.

Further, lock box 100 is illustrated as sized to receive and secure a single car. In other embodiments, lock box 100 may be configured to receive and secure other types of vehicles, such as but not limited to a truck or motorcycle. Moreover, in still other embodiments, lock box 100 may be configured to receive and secure two or more vehicles. Although these embodiments secure different types or sizes of vehicles, they function and operate substantially the same as described above.

Figure 2:
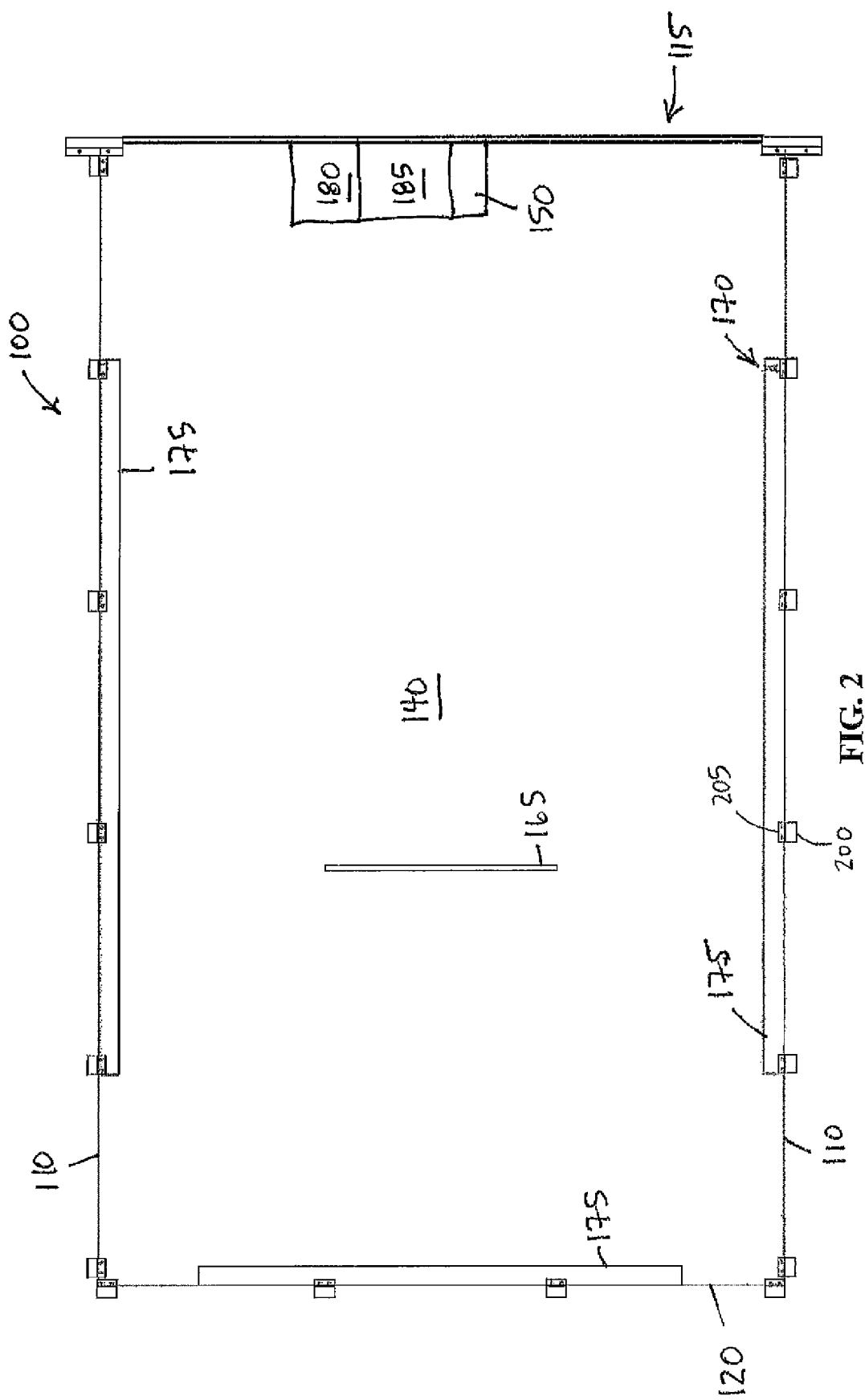
FIG. 2 is a plan view of the vehicle lock box of FIG. 1, illustrating the lock box interior.

A plan view of lock box 100 is shown in FIG. 2, illustrating the interior features of enclosure 140. Lock box 100 further includes one or more lighting panels 165, electrical outlets 170, and bumper guards 175. Lighting panels 165 are coupled to and suspend from ceiling 130 of parking garage 105 within enclosure 140 to provide illumination for the user's convenience and/or security. Lighting panels 165 may be configured to operate by manual actuation of a switch by the user, or to automatically turn on and off when entry 115 is opened and closed, respectively. Alternatively, any of lighting panels 165 may include a light-sensitive photocell that enables the lighting panel 165 to turn on and off when the surrounding light intensity is too dim or too blight, respectively. Electrical outlets 170 may also be positioned along any or all of sidewalls 110 and rear wall 120 to enable the user to charge vehicle 145 (FIG. 1), in the case where vehicle 145 is an electric car, and/or electronic devices, such as a cellular phone. Bumper guards 175 may be positioned along any or all of sidewalls 110 and rear wall 120, and are configured to prevent damage, such as door dings, when the front end or doors of vehicle 145 inadvertently contact lock box 100.

Lighting panels 165, electrical outlets 170, EAS 150, and drive mechanism 185 are electrically coupled to a power source in proximity to parking garage 105. For example, the power source may be embedded within floor 125 of parking garage 105 over which lock box 100 is assembled. Lock box 100 may optionally include a power transformer 180 coupled to entry 115. Power transformer 180 is electrically coupled between the power source and at least one of lighting panels 165, electrical outlets 170, EAS 150, and drive mechanism 185, and configured to convert power provided by the power source to a form usable by any of lighting panels 165, electrical outlets 170, EAS 150, and drive mechanism 185 coupled thereto. In at least some embodiments, the user may incur an additional fee corresponding to power consumption resulting from use of lighting panels 165, electrical outlets 170, EAS 150, and/or drive mechanism 185 during the time vehicle 145 is secured within lock box 100.

In the illustrated embodiment, each sidewall 110 and its coupling between floor 125 and ceiling 130 of parking garage 105 are substantially identical. Moreover, rear wall 120 is similar in configuration, aside from dimensional differences which may exist in at least some embodiments. Thus, the following description, which is directed to one sidewall 110, applies equally to the other sidewall 110 and rear wall 120. Sidewall 110 includes a plurality of vertically extending tubular members 200, each tubular member 200 disposed between a pair of clip hangers 205. Referring to FIG. 3A, one clip hanger 205, specifically, clip hanger 230, is coupled to ceiling 130 of parking garage 105. Another clip hanger 205, illustrated as clip hanger 235, is coupled to floor 125 of parking garage 105.

FIGS. 3B and 3C are cross-sectional side and end views, respectively, of clip hanger 230 with an end of tubular member 200 inserted thereover. FIGS. 3D and 3E illustrate similar views of clip hanger 235. As shown, each clip hanger 230, 235 includes a base plate 210 and a tubular portion 215 extending therefrom. In this embodiment, tubular portion 215 is coupled to base plate 210 by a weld 220. In other embodiments, tubular portion 215 may be coupled to base plate 210 by other equivalent means known in the industry, or formed integrally with base plate 210. Base plate 210 of clip hanger 235 is coupled to floor 125 by a pair of bolts 225 extending through base plate 210 into floor 125. Base plate 210 of clip hanger 230 is coupled similarly to ceiling 130.

Each tubular portion 215 is configured such that it is insertable within an open end of tubular member 200, as shown in FIGS. 3B and 3D. Referring specifically to FIG. 3D, tubular member 200 is extended over tubular portion 215 of clip hanger 235 to abut base plate 210. Further, tubular member 200 and other components coupled thereto, described below, are supported by base plate 210, and thus floor 125 of parking garage 105. To provide lateral support to tubular member 200 at its lower end 280, an angle iron 285 is positioned against tubular member 200 with skin 260, described below, positioned therebetween and coupled to base plate 210 of clip hanger 235 by bolts 220.

In contrast, and referring specifically to FIG. 3B, tubular member 200 is extended over tubular portion 215 of clip hanger 230 but does not abut base plate 210. Rather, the length of tubular member 200 is selected such that, when installed between clip hangers 230, 235, there is some clearance 240 between the upper end 245 of tubular member 200 and base plate 210 of clip hanger 230. In some embodiments, clearance 240 is approximately equal to two inches. It should be appreciated that, in other embodiments, clearance 240 may be less than or greater than two inches. Clearance 240 enables some movement of tubular member 200 relative clip hanger 230, and thus ceiling 130 coupled thereto. Such relative movement may be caused by flexing of floor 125 and/or ceiling 130 of parking garage 105 due to loads exerted thereon by, for example, movement of vehicles passing through parking garage 105. By enabling limited movement of tubular member 200 relative to ceiling 130, over loading, or over stressing, of tubular member 200 is prevented.

Figure 4:
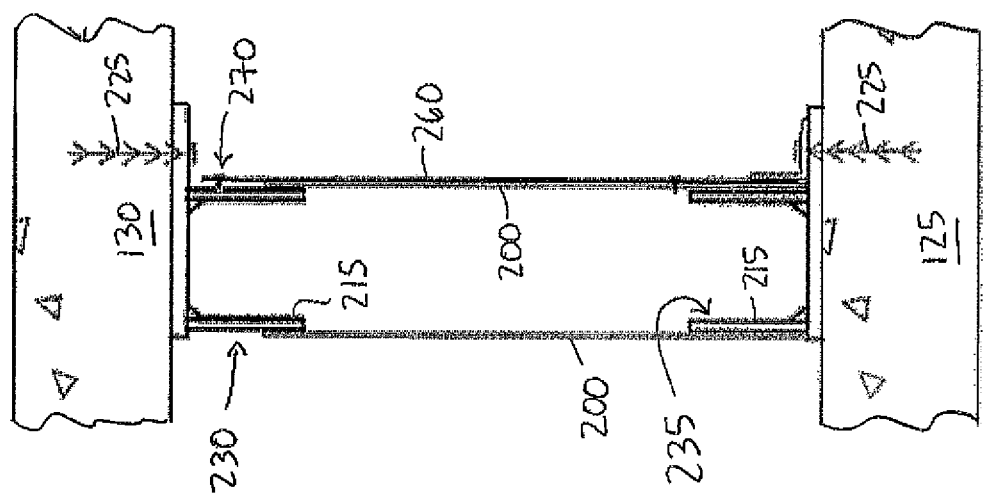
FIG. 4 is a side view of the skin coupled to the tubular member of FIG. 3A through 3E.

An opening 265 (FIG. 1) to enclosure 140 is formed between each adjacent pair of vertically extending tubular members 200. To complete sidewall 110, a skin 260 is coupled proximate its lower edge to tubular members 200, as shown in FIG. 3D, and proximate its upper edge to tubular portion 215 of clip hanger 230, as shown in FIG. 4, by a plurality of fastening means 270. In some embodiments, fastening means 270 includes a self-tapping screw and washer. Skin 260 extends across each opening 265, thereby covering opening 265 and preventing access therethrough to lock box 100. Further, skin 260 is resistive to penetration, cutting, and/or other destructive action which would result in an opening through skin 260 to the interior of lock box 100. Also, skin 260 is perforated, or grated, to enable sunlight and air to pass therethrough, thereby promoting the security and ventilation of lock box 100. In this embodiment, skin 260 includes a layer of perforated metal.

Figure 5:
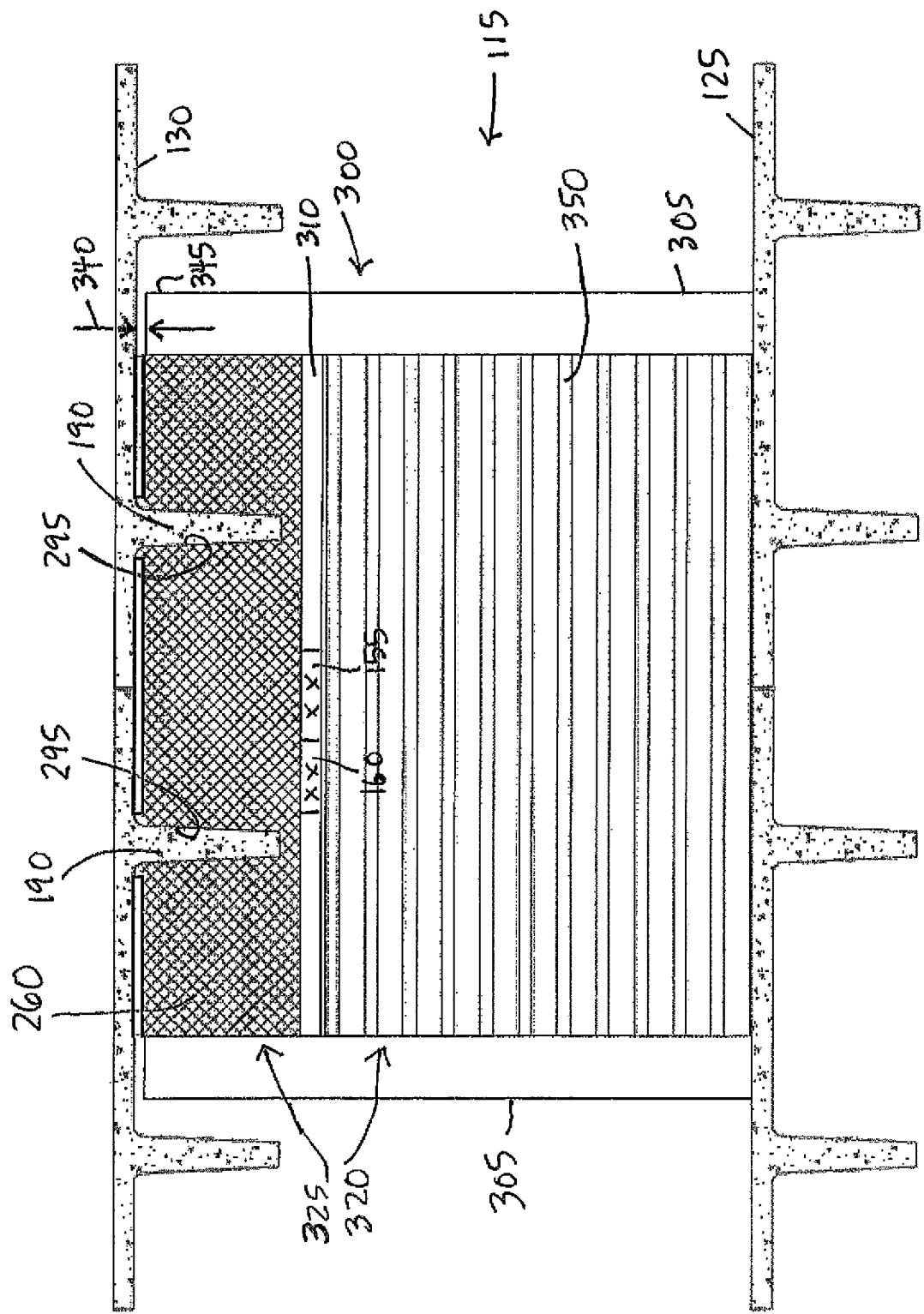
FIG. 5 is an exterior front view of the vehicle lock box of FIG. 2.
Figure 6B:
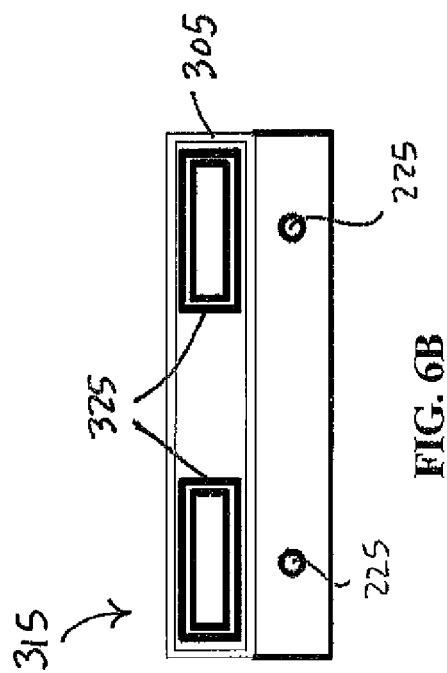
FIGS. 6A and 6B are cross-sectional side and end views of a tubular member of the lock box entry of FIG. 2.
Figure 6A:
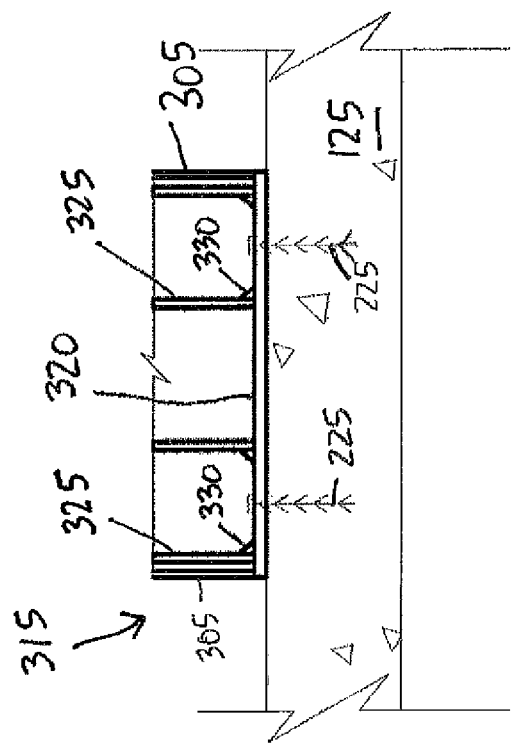

Turning now to FIG. 5, entry 115 includes a frame 300 formed by two vertically extending tubular members 305 and a tubular header 310 extending substantially normally therebetween. In at least some embodiments, unique identifier 155 and telephone number 160 are displayed on the exterior surface of tubular header 310. Each tubular member 305 is disposed over a clip hanger 315 (FIG. 6A), which is coupled to floor 125 of parking garage 105. Referring briefly to FIGS. 6A and 6B, which are cross-sectional side and end views, respectively, of one tubular member 305 inserted over a clip hanger 315, each clip hanger 315 includes a base plate 320 and two tubular portions 325 extending therefrom. In this embodiment, each tubular portion 325 is coupled to base plate 320 by a weld 330. In other embodiments, tubular portions 325 may be coupled to base plate 320 by other equivalent means known in the industry, or formed integrally with base plate 320. Base plate 320 of clip hanger 315 is coupled to floor 125 by a pair of bolts 225 extending through base plate 320 into floor 125.

The configuration of each tubular portion 325 and the spacing therebetween are selected such that both portions 325 are insertable within an open end of tubular member 305, as shown. Moreover, tubular member 325 is extended over tubular portion 325 of clip hanger 315 to abut base plate 320. Tubular member 305 and other components coupled thereto, described below, are supported by base plate 320, and therefore floor 125 of parking garage 105.

Returning to FIG. 5, the length of tubular members 305 is selected such that, when each is installed over a clip hanger 315, there is some clearance 340 between the upper end 345 of tubular member 305 and ceiling 130 of parking garage 105. In some embodiments, clearance 340 is approximately equal to two inches. It should be appreciated that, in other embodiments, clearance 340 may be less than or greater than two inches. Clearance 340 enables some movement of tubular member 305 relative to ceiling 130. As previously described, this relative movement may be caused by flexing of floor 125 and/or ceiling 130 of parking garage 105 due to loads exerted thereon, such as by movement of vehicles passing through parking garage 105. By enabling limited movement of tubular member 305 relative to ceiling 130, over loading, or over stressing, of tubular member 305 is prevented.

An opening 325 is formed between tubular members 305 and ceiling 130 above tubular header 310, and an opening 320 is formed between tubular members 305 and floor 125 below tubular header 310. As will be described, lock box 100 further includes a rolling door 350, which can be lowered to cover opening 320, as shown, and subsequently retracted. Opening 325, on the other hand, is covered by skin 260 to prevent access therethrough to lock box 100.

Skin 260 is coupled proximate its upper edge to ceiling 130 of parking garage 105 and along its remaining edges to tubular members 305 and tubular header 310. In some embodiments, skin 260 is coupled to ceiling 130 by a plurality of fastening means 270 inserted into a plurality of angle irons 285, each angle iron 285 coupled to ceiling 130 via a bolt 225 (FIG. 7). Also, in some embodiments, skin 260 is coupled to tubular members 305 and tubular header 310 by a plurality of fastening means 270. Because skin 260 is coupled between ceiling 130, tubular members 305, and tubular header 310, each of which may move relative to the others due to flexing of ceiling 130 and/or floor 125, skin 260 is further configured to flex. In some embodiments, skin 260 includes at least one substantially laterally extending corrugation 290, illustrated in FIG. 7, which enables flexing of skin 260 to accommodate relative movement of ceiling 130, tubular members 305, and tubular header 310 without damage to skin 260. Referring again to FIG. 5, depending on the construction of ceiling 130, skin 260 may further include one or more cut-outs 295 configured to receive therein a stiffening member or rib 190 of ceiling 130.

To promote security of lock box 100, vehicle 145 disposed therein, and its contents, the fastening devices, including bolts 225 coupling clip hangers 230, 235 to ceiling 130 and floor 125 of parking garage 105, bolts 225 coupling clip hangers 315 to floor 125, and fastening means 270, which secures skin 260 over openings 265 between adjacent tubular members 200 and over opening 325 between tubular members 305, are positioned such that they are only accessible from the interior of lock box 100. Thus, these fastening devices may not be decoupled to permit unauthorized entry into lock box 100.

Figure 8:
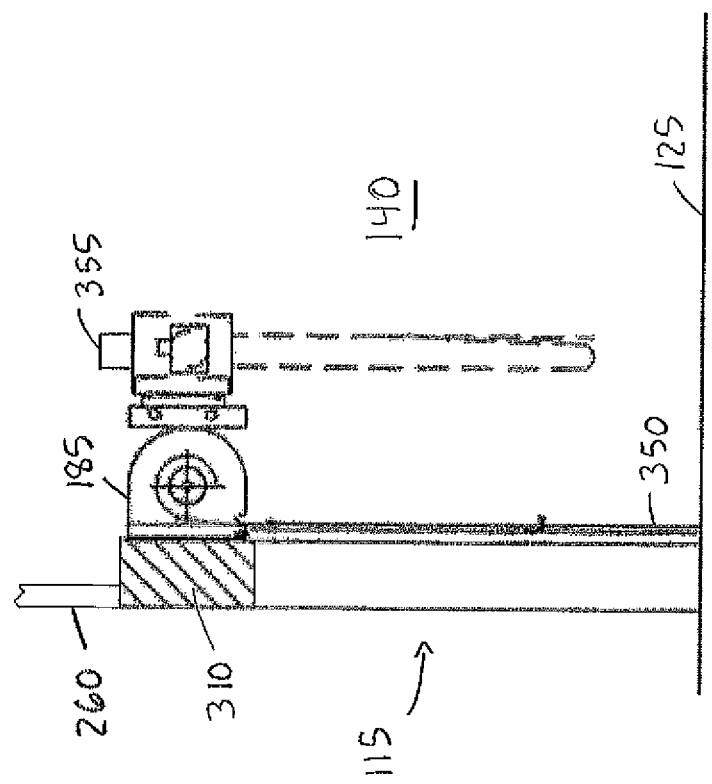
FIG. 8 is an interior side view of the lock box entry.

Embodiments of lock box 100 further include rolling door 350 and drive mechanism 185 coupled thereto, both shown in FIG. 8. As previously mentioned, rolling door 350 is extendable to cover opening 320 of entry 115, thereby preventing access to enclosure 140, and retractable to provide access into enclosure 140 through opening 320. Rolling door 350 is perforated to enable air and light to pass therethrough, promoting both security and ventilation of lock box 100. In some embodiments, rolling door 350 includes perforated metal.

Drive mechanism 185 is coupled to rolling door 350 and electrically coupled to EAS 150. When an electric signal is received from EAS 150, drive mechanism 185 is actuated to retract rolling door 350 if extended and to extend rolling door 350 if retracted. Thus, entry 115 is opened and closed, as desired, to limit or control access to lock box 100. In some embodiments, lock box 100 further includes a backup power supply 355, such as a battery. Backup power supply 355 is mounted on drive mechanism 185 to provide power to drive mechanism 185 in the event electricity cannot be provided from the power source, as previously described. Further, drive mechanism 185 is mounted to and supported by tubular header 310 of entry 115 within enclosure 140. As such, drive mechanism 185 is inaccessible from the exterior of lock box 100 and cannot be tampered with to force rolling door 350 to raise and thereby enable unauthorized entry into lock box 100.

Figure 9:
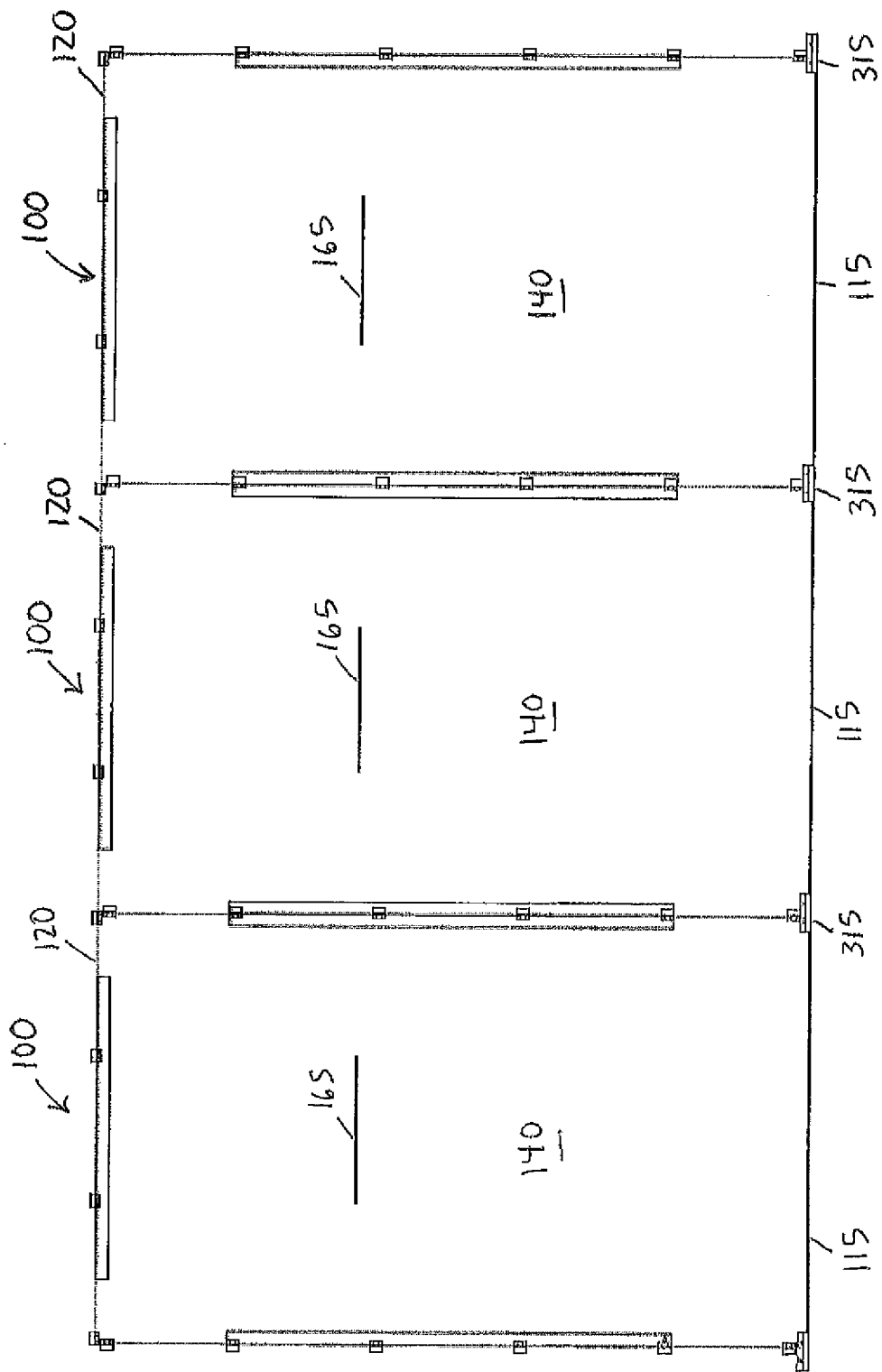
FIG. 9 is a plan view of three vehicle lock boxes installed in an aligned arrangement.
Figure 10:
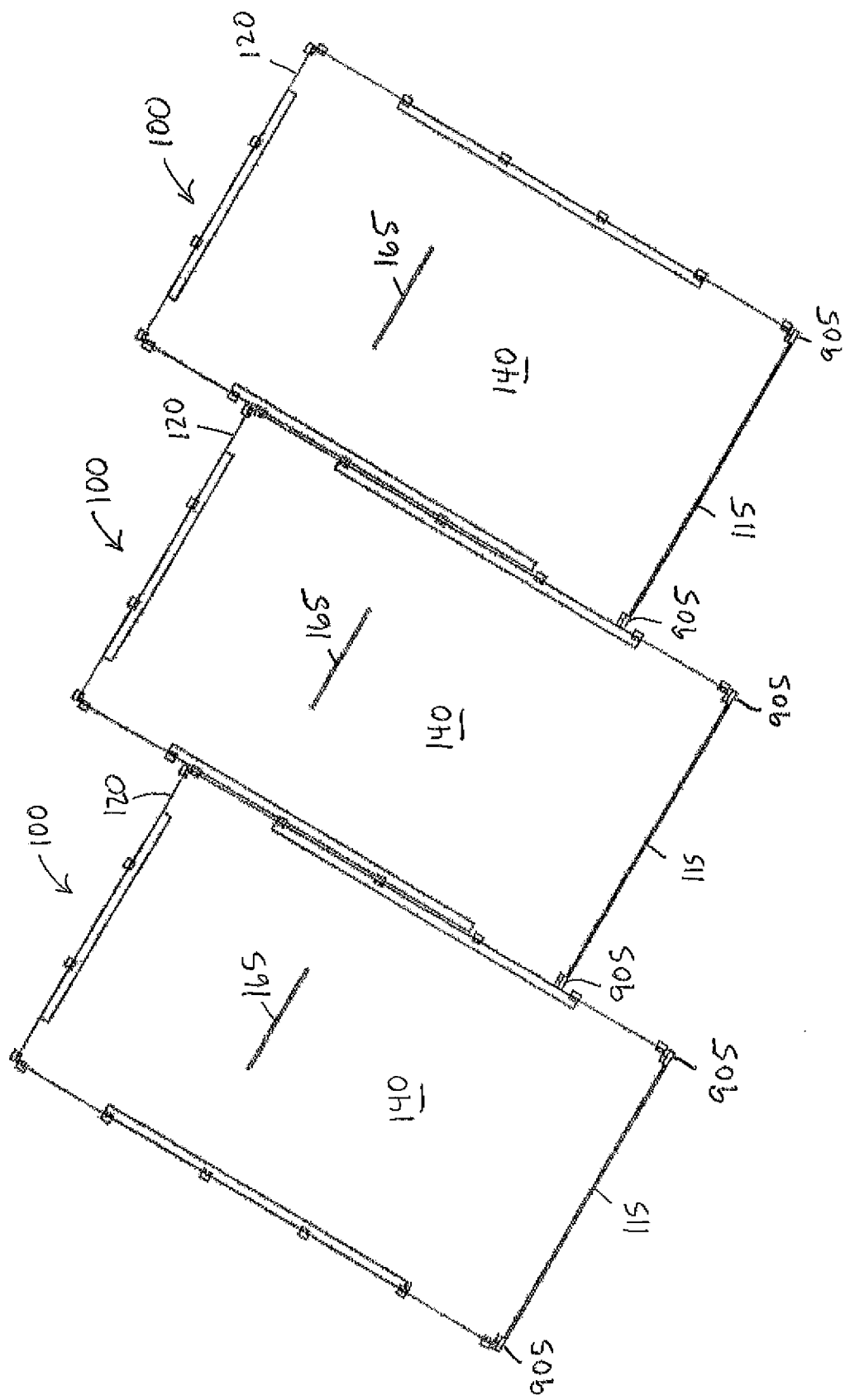
FIG. 10 is a plan view of three vehicle lock boxes installed in a staggered arrangement.

A plurality of lock boxes 100 may be positioned within a parking garage, such as parking garage 105 (FIG. 1), to enable multiple users to each secure their own vehicle independent of the other secured vehicles. When so installed, lock boxes 100 may be positioned side by side and aligned, as shown in FIG. 9. In some aligned configurations, frame 300 of entry 115 of each pair of adjacent lock boxes 100 shares a common tubular member 305 and clip hanger 315. Moreover, adjacent lock boxes 100 share a common sidewall 110. Alternatively, lock boxes 100 may be installed side-by-side but staggered relative to each other, rather than aligned, as shown in FIG. 10. In such staggered configurations, clip hangers 315 may be replaced with clip hangers 905 which are similar in design to clip hangers 205 to enable staggered, side-by-side positioning of adjacent lock boxes 100. Consequently, each tubular member 315 may have a smaller cross-section, relative to that illustrated in FIGS. 6A and 6B, to accommodate coupling with clip hangers 905.

As previously mentioned in regard to FIG. 5, depending on the construction of parking garage 105, ceiling 130 may include one or more stiffening members or ribs 190 extending therefrom. Moreover, depending upon the spacing of such ribs 190, it may be necessary to modify the coupling of each entry 115 to ceiling 130 when positioning two or more lock boxes 100 in an aligned, side-by-side configuration. For instance, and referring now to FIGS. 11A and 11B, two lock boxes 100 are shown in an aligned, side-by-side configuration. Ceiling 130 of parking garage 105 includes a plurality of ribs 190 extending therefrom. The spacing of ribs 190 is such that the coupling of each entry 115 of lock boxes 100 with ceiling 130 is necessarily modified, relative to that described above with respect to FIG. 5, to accommodate one rib 190 which is disposed substantially in alignment with the tubular member 305 shared by each lock box 100.

In particular, the length of shared tubular member 305 is selected such that there is some clearance 500 between its upper end 345 and rib 190. A support plate 505 is positioned within clearance 500 and coupled to end 345 of tubular member 305. Clearance 500 is sufficient to enable movement of tubular member 305 and support plate 505 coupled thereto due to flexing of ceiling 130 and/or floor 125 without the occurrence of contact between rib 190 and support plate 505.

Two substantially shorter tubular members 510 are coupled to support plate 505 and extend upwards from plate 505 toward ceiling 130, each member 510 straddling an opposite side of rib 190. In some embodiments, tubular members 305, 510 and support plate 505 are coupled by welding. In other embodiments, these components 305, 505, 510 are coupled by other equivalent means known in the industry. Alternatively, two or more of these components 305, 505, 510 may be integrally formed.

The upper end of each tubular member 510 is inserted over a clip hanger 515, which is substantially similar, if not identical, both in structure and function, to clip hangers 205 described previously with respect to and shown in FIGS. 3A-3E. Each clip hanger 515 is coupled to ceiling 130 on opposite sides of rib 190. The length of tubular members 510 is selected to provide some clearance 520 between their upper ends 525 and base plates 530 of clip hangers 515 to enable for movement of tubular members 510 relative to clip hangers 515 due to flexing of ceiling 130 and/or floor 125, as previously described. Aside from the modified coupling of each entry 115 of aligned lock boxes 100 to ceiling 130 for the purpose of accommodating rib 190 disposed therebetween, the structure, function, and operation of each lock box 100 remains substantially the same as previously described.

While various preferred embodiments have been shown and described, modifications thereof can be made by one skilled in the art without departing from the spirit and teachings herein. The embodiments herein are exemplary only, and are not limiting. Many variations and modifications of the apparatus disclosed herein are possible and within the scope of the invention. Accordingly, the scope of protection is not limited by the description set out above, but is only limited by the claims which follow, that scope including all equivalents of the subject matter of the claims.

What is claimed is:

1. A system for securing a vehicle within a parking garage, the system comprising:
   an enclosure formed by a multi-walled structure positioned between a floor and a ceiling of the parking garage and configured to receive and secure a vehicle therein, the enclosure having a closeable opening through which the vehicle is accessible;
   a user identification display on the enclosure;
   an attendant system remotely located from the enclosure and the parking garage, and configured to control access to the vehicle through the opening; and
   an electronic actuation system configured to receive a first signal from the remotely located attendant system and to deliver a second signal, whereby the opening is covered or exposed;
   wherein the remotely located attendant system is configured to receive information from an individual user positioned proximate the enclosure, the user identification display, and a communication device, wherein the received information includes information from the user identification display transmitted via the user-operated communication device, and whereby the individual user is authorized to cover or expose the opening;
   wherein the electronic actuation system is configured to cover or expose the opening in response to the individual authorized user and the remotely located attendant system to control access to a vehicle of the individual authorized user through the opening.

2. The system of claim 1, further comprising:
   a door that is extendable to cover the opening and retractable to expose the opening; and
   a drive mechanism coupled to the door, the drive mechanism configured to receive the second signal and to extend or retract the door upon receipt of the second signal.

3. The system of claim 2, wherein the drive mechanism is mounted within the enclosure and inaccessible from outside of the enclosure.

4. The system of claim 1, wherein the remotely located attendant system comprises:
   an attendant configured to receive a request for access to the vehicle of the individual authorized user; and
   a transmitter for generating the first signal.

5. The system of claim 4, wherein the attendant is an automated system.

6. The system of claim 1, wherein the multi-walled structure includes at least one wall comprising a skin coupled to a frame by coupling members having fasteners accessible only from inside of the enclosure.

7. The system of claim 1, wherein the multi-walled structure includes at least one wall comprising a skin coupled to a frame and configured to enable light to pass therethrough.

8. The system of claim 1, wherein the multi-walled structure includes at least one wall comprising a skin coupled to a frame and configured to enable air to pass therethrough.

9. The system of claim 1, wherein the information includes a unique enclosure identifier.

10. The system of claim 9, wherein the remotely located attendant system is configured to link the unique enclosure identifier to the individual authorized user.

11. The system of claim 1, wherein only the individual authorized user controls access to the vehicle of the individual authorized user.

12. The system of claim 1, wherein the individual authorized user can secure the vehicle of the individual authorized user in the enclosure independently of other vehicles.

13. A method for securing a vehicle within a parking garage, the method comprising:
   positioning an enclosure formed by a multi-walled structure between a floor and a ceiling of the parking garage, the enclosure having a closeable opening through which a vehicle is accessible, the enclosure having a unique identifier displayed on a user identification display;
   receiving the unique identifier from an individual user at an attendant system remotely located from the enclosure and the parking garage, wherein the unique identifier is received from a user-operated communication device;
   authorizing the individual user at the remotely located attendant system;
   linking the authorized individual user to the unique identifier;

allowing access to the enclosure through the opening using the remotely located attendant system;

receiving a vehicle of the individual authorized user in the enclosure; and securing the vehicle of the individual authorized user in the enclosure.

14. The method of claim 13 further comprising re-opening the enclosure only in response to the individual authorized user.

* * * * *